United States Patent
de la Oliva et al.

(10) Patent No.: US 12,395,817 B2
(45) Date of Patent: Aug. 19, 2025

(54) SYSTEMS AND METHODS RELATED TO ENHANCED BROADCAST SERVICES IN A MULTI-ACCES POINT SYSTEM

(71) Applicant: InterDigital Patent Holdings, Inc., Wilmington, DE (US)

(72) Inventors: Antonio de la Oliva, Madrid (ES); Robert Gazda, Spring City, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 317 days.

(21) Appl. No.: 17/793,610

(22) PCT Filed: Jan. 29, 2021

(86) PCT No.: PCT/US2021/015781
§ 371 (c)(1),
(2) Date: Jul. 18, 2022

(87) PCT Pub. No.: WO2021/155201
PCT Pub. Date: Aug. 5, 2021

(65) Prior Publication Data
US 2023/0080757 A1 Mar. 16, 2023

Related U.S. Application Data

(60) Provisional application No. 62/968,413, filed on Jan. 31, 2020.

(51) Int. Cl.
*H04W 4/06* (2009.01)
*H04W 48/14* (2009.01)

(52) U.S. Cl.
CPC ............. *H04W 4/06* (2013.01); *H04W 48/14* (2013.01)

(58) Field of Classification Search
CPC ................................ H04W 4/06; H04W 48/14
See application file for complete search history.

(56) References Cited

U.S. PATENT DOCUMENTS

| 10,492,103 B2 | 11/2019 | Song et al. |
| 2010/0254352 A1 | 10/2010 | Wang et al. |

(Continued)

FOREIGN PATENT DOCUMENTS

| CN | 101296416 A | 10/2008 |
| CN | 101400017 A | 4/2009 |

(Continued)

OTHER PUBLICATIONS

The Institute of Electrical and Electronics Engineers, Inc. (IEEE), "Functional Requirements Document", Wireless LANs, 802.11bc, Jan. 2019, 5 pages.

(Continued)

*Primary Examiner* — Natasha W Cosme
(74) *Attorney, Agent, or Firm* — Flaster Greenberg P.C.

(57) ABSTRACT

As disclosed herein, there are one or more methods, systems, and/or devices relating to enhanced broadcast services and network optimization. In one example, a wireless network node may send a consumed service discovery request to a station (STA) via an access network query protocol (ANQP), wherein the STA is not associated with the network node. The network node may receive a consumed service discovery response including a set of service IDs and a BSSID of an access point (AP) for each service ID in the set of service IDs, wherein each service ID of the set of service IDs is a service consumed by the STA. In some cases, the consumed services are enhanced broadcast services (eBCS), the request is an ANQP query encapsulated in a GAS broadcast message, and/or request is an ANQP query encapsulated in a GAS groupcast message or a GAS unicast message.

22 Claims, 9 Drawing Sheets

(56) References Cited

U.S. PATENT DOCUMENTS

| | | | |
|---|---|---|---|
| 2010/0265867 A1 | 10/2010 | Becker et al. | |
| 2012/0165056 A1* | 6/2012 | Kim | H04W 16/14 455/509 |
| 2020/0008095 A1* | 1/2020 | Patil | H04W 12/03 |

FOREIGN PATENT DOCUMENTS

| | | |
|---|---|---|
| CN | 101884230 A | 11/2010 |
| CN | 104838695 A | 8/2015 |
| CN | 107534501 A | 1/2018 |
| WO | WO 2014/106434 A1 | 7/2014 |
| WO | WO 2015/042189 A1 | 3/2015 |

OTHER PUBLICATIONS

The Institute of Electrical and Electronics Engineers, Inc. (IEEE), "Use Case Document", 802.11-19/0268r5, Jul. 2019, 14 pages.

The Institute of Electrical and Electronics Engineers, Inc. (IEEE), "Ebcs Frame Authentication Proposal", 802.11-19/0451r5, Sep. 2019, 39 pages.

The Institute of Electrical and Electronics Engineers, Inc. (IEEE), "Telecommunications and Information Exchange between Systems Local and Metropolitan Area Networks", IEEE Computer Society, 802.Nov. 2020 (Revision of IEEE Std 802.11-2016), Dec. 3, 2020, 2 Parts.

The Institute of Electrical and Electronics Engineers, Inc. (IEEE), "Advertising WUR Discovery Frame Related Info for Fast Scanning", 802.11-18/0244r1, Feb. 2018, 13 pages.

The Institute of Electrical and Electronics Engineers, Inc. (IEEE), "Functional Requirements Document Proposed Update", 802.11-19/1001r0, Wireless LANs, Jun. 2019, 4 pages.

IEEE 802.11-19/1999r1 "Broadcast Demonstration", Inoue, Yasuhiko, et al., Nov. 2019, 14 pages.

* cited by examiner $$\min \sum_N AP_n$$
$AP = AP_1, AP_2, ..., AP_n$
$eBCS = eBCS_{i,j,k}$ ∀i, eBCS service, ∀j, AP, ∀k, STA
subject to
$eBCS_{i,j,k} \leq AP_j$, ∀i served by j, ∀k connected to j
$AP_j \geq \sum_k eBCS_{i,j,k}$, ∀i served by j, ∀k connected to j
$\sum_j eBCS_{i,j,k} \geq 1$, ∀i served by j, ∀k connected to j

SYSTEMS AND METHODS RELATED TO ENHANCED BROADCAST SERVICES IN A MULTI-ACCES POINT SYSTEM

CROSS REFERENCE TO RELATED APPLICATIONS

This application is the 371 National Stage of International Application No. PCT/US2021/015781, filed Jan. 29, 2021, which claims the benefit of U.S. Provisional Application No. 62/968,413, filed Jan. 31, 2020, which is incorporated by reference as if fully set forth.

BACKGROUND

In future use cases for wireless communication systems, such as a Beyond 5G (B5G) Future Home, there may be a need for a wide range of innovative applications and services to people and devices, including: immersive mixed-reality gaming, home security/surveillance (e.g., monitoring by autonomous drones, etc.), in-home health care and aging, holoportation/hologram on lightweight XR glasses, etc. To realize these use-cases, there is a need for multiple devices, with wide ranging capabilities, all connected wirelessly via a range of access technologies, cooperating with each other (e.g., use of broadcast or multicast services to distribute video, sensor information, and other data).

SUMMARY

As disclosed herein, there are one or more methods, systems, and/or devices relating to enhanced broadcast services and network optimization. In one example, a wireless network node may send a consumed service discovery request to a station (STA) via an access network query protocol (ANQP), wherein the STA is not associated with the network node. The network node may receive a consumed service discovery response including a set of service IDs and a BSSID of an access point (AP) for each service ID in the set of service IDs, wherein each service ID of the set of service IDs is a service consumed by the STA. In some cases, the consumed services are enhanced broadcast services (eBCS), the request is an ANQP query encapsulated in a GAS broadcast message, and/or request is an ANQP query encapsulated in a GAS groupcast message or a GAS unicast message.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
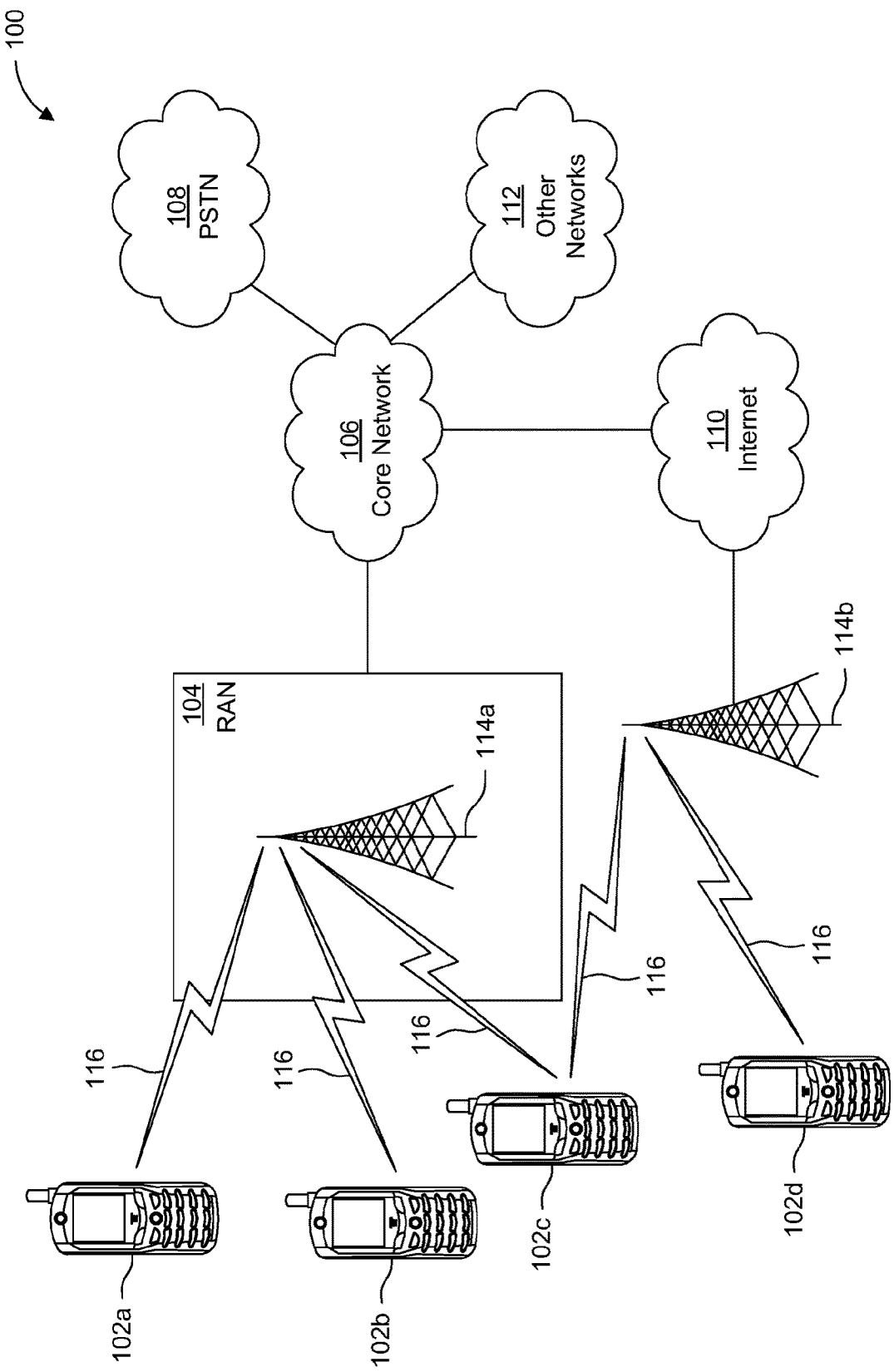
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point (AP), for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
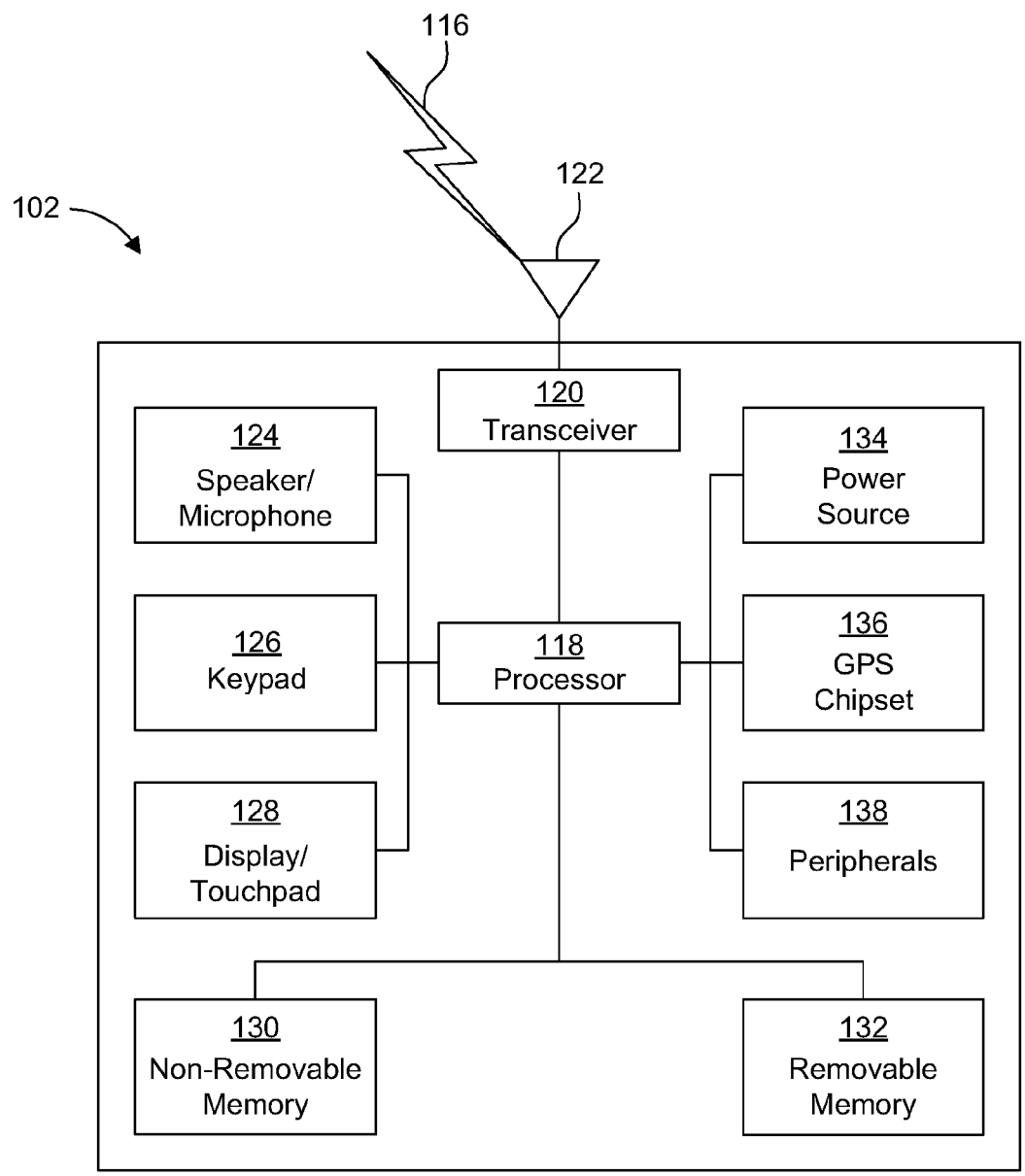
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
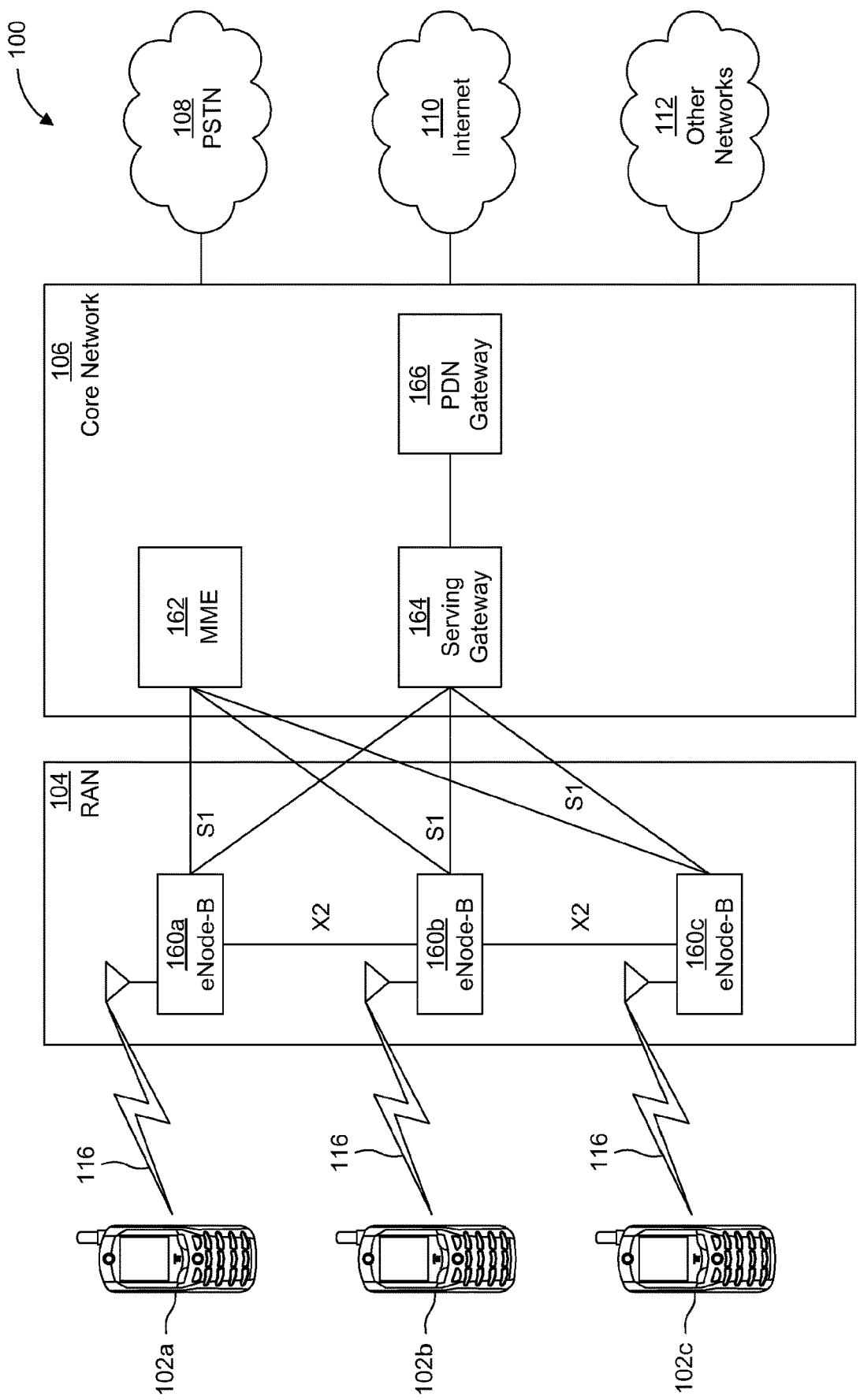
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
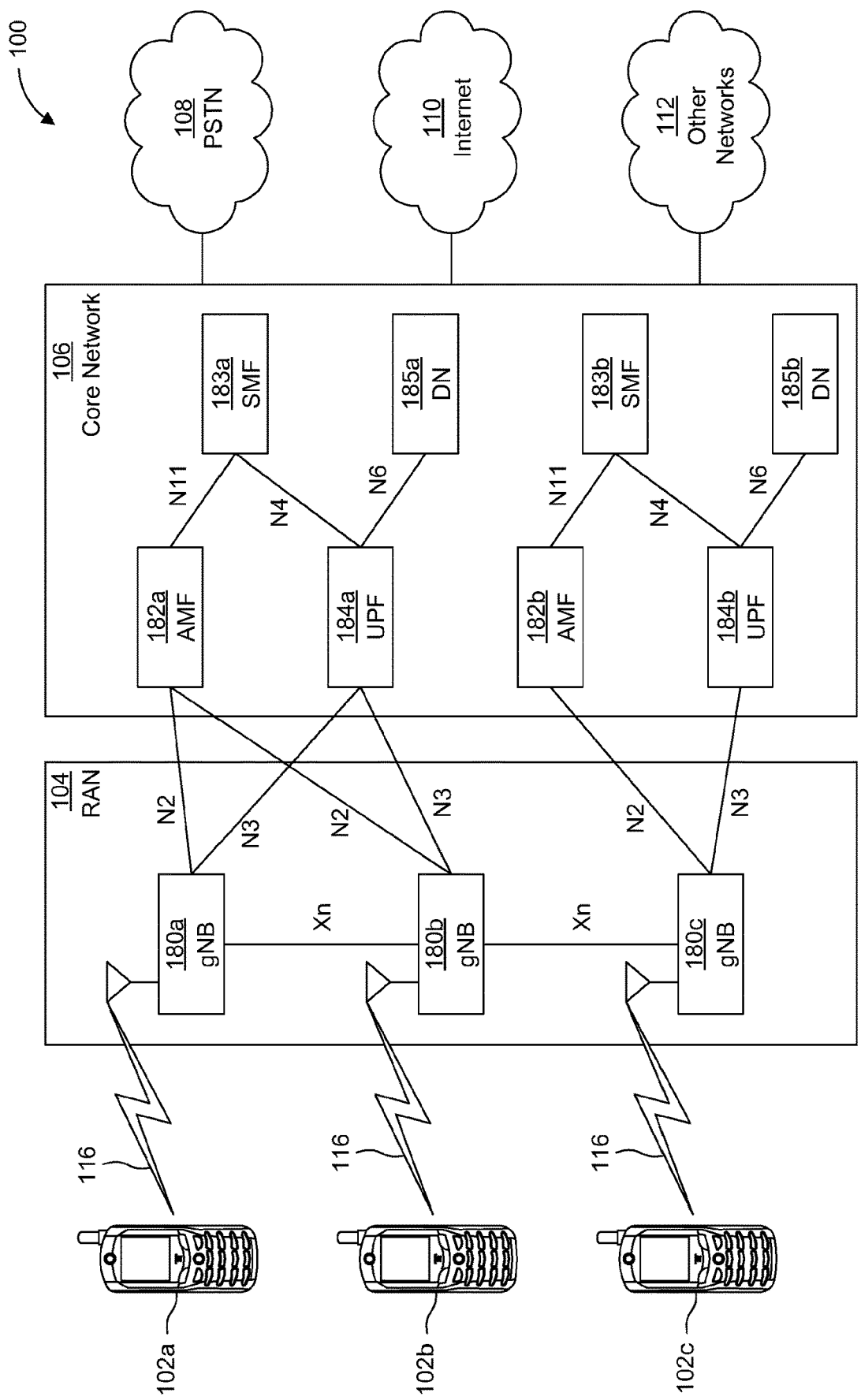
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUsb 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

Figure 1E:
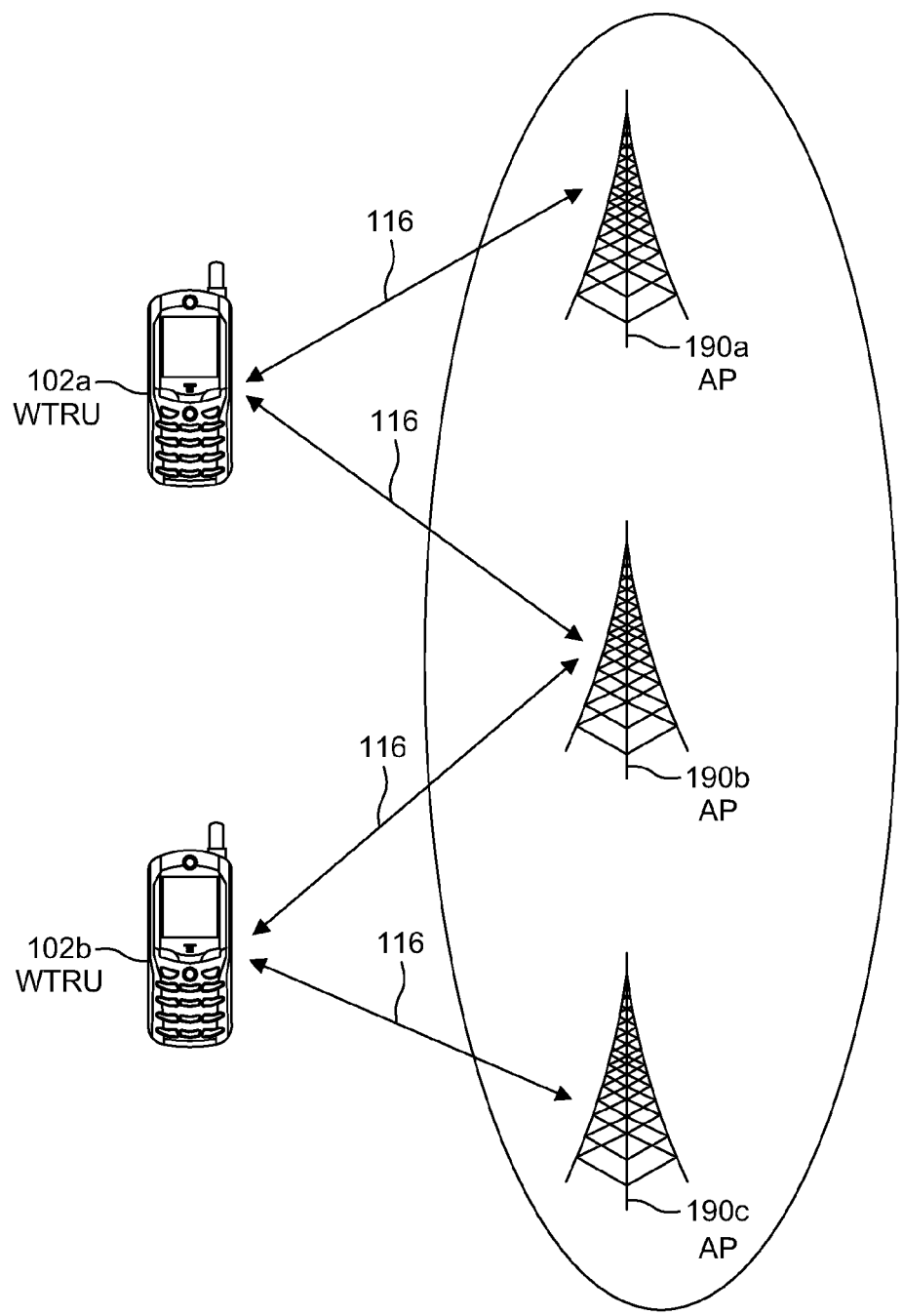
FIG. 1E is a system diagram illustrating an example multi-AP communications system in which one or more disclosed embodiments may be implemented.

FIG. 1E is a system diagram illustrating an example multi-AP communications system in which one or more disclosed embodiments may be implemented. As shown in FIG. 1E, the multi-AP system 191 may include multiple base stations, such as access points (APs). An access point may also include additional functionality such as a gateway or a router. One or more of the APs of the multi-AP system 191 may be part of, or comprise, a mesh WiFi network. WTRUs 102a and/or 102b may communicate with one or more of the APs of the multi-AP system 191. For example, WTRU 102a may communicate with AP 190a and/or AP 190b; WTRU 102b may communicate with AP 190b and/or AP 190c. WTRU 102a/102b may be associated with one or more of the APs of the multi-AP system 191, and/or WTRU 102a/102b may not be associated with the one or more APs of the multi-AP system 191. An AP of the multi-AP system may provide other network access to the other APs and/or WTRUs, wherein other networks may the internet, closed local networks, and the like. Though a limited number of WTRUs and APs are shown in FIG. 1E, it will be appreciated that the disclosed embodiments contemplates any number of WTRUs, base stations, APs, networks, and/or other network elements. Each of the WTRUs 102a, 102b, 102c, 102d may be any type of device configured to operate and/or communicate in a wireless environment. By way of example, the WTRUs 102a/102b may be referred to as a station (STA) in an 802.11 wireless network. Each AP of the multi-system AP may communicate with each other wirelessly or wired.

In view of FIGS. 1A-1E, and the corresponding description of FIGS. 1A-1E, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, APs 190a-c, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

IEEE 802.11bc specifies modifications to the IEEE 802.11 medium access control (MAC) specifications that enable enhanced transmission and reception of broadcast data both in an infrastructure BSS, where there is an association between the transmitter and the receiver(s), and in cases where there is no association between transmitter(s) and receiver(s). This scenario may be referred to as Enhanced Broadcast Services (eBCS).

Use cases for IEEE 802.11bc may extend to the B5G Future Home such as: stadium video distribution, low power sensor UL broadcast, intelligent transportation broadcast, broadcast services for event production, multi-lingual and emergency broadcast, VR eSports video distribution, multi-channel data distribution, lecture room slide distribution, regional based broadcast TV service, and AP tagged UL Forwarding.

Stadium video distribution may be used for providing enhanced Broadcast Services (eBCS) for videos to a large number of densely located WTRUs. These WTRUs may be associated, or unassociated with an AP or may be WTRUs that do not transmit.

Low power sensor uplink (UL) broadcast may be used for pre-configured IoT devices to automatically connect to a end server through eBCS APs with zero setup action required. This functionality includes Low power IoT devices in mobility report to their servers through eBCS APs without scanning and association.

Intelligent transportation broadcast may be used for Connected Vehicle Roadside Equipment (RSE), Connected Vehicle (OBE) and/or a Personal Informational Device (PID) to provide eBCS service for transportation related information for railway crossing or RSE to provide eBCS services for local traveler information.

Broadcast services for event production may be used for providing eBCS for multiple data streams suitable for different customer WTRUs. The number of WTRUs may be large and these WTRUs may be static or mobile.

Multi-lingual services and/or emergency broadcast services may be provided for using eBCS to a large number of densely located WTRUs. These WTRUs may be associated, or unassociated with the AP or may be WTRUs that do not transmit. These WTRUs may be static or mobile.

VR eSports video distribution may be used at the location of VR eSports games, such as arena, where eBCS may distribute the video that is the view of the player to the audiences.

eBCS may enable multi-channel data distribution may be used in an AP that broadcasts the same information in different languages each in a dedicated channel. A user can choose one of the channels.

Lecture room slide distribution may be used for simultaneous distribution of slides on the screen to audience PC, Tablet, etc. The audience does not need to download visual aids and change pages. Synchronized slide distribution to all students or members of the audience.

Regional based broadcast TV service may be used to for Local news and TV content to be distributed to consumer BYOD devices (not TV receiver) by small local TV company. In case of disaster, evacuation information will be distributed without any complex customer operation.

AP tagged UL forwarding may be used for a pre-configured low-cost low power tracker device automatically connects to an end server through eBCS APs in the neighborhood with zero setup action. Tracker device periodically reports to its server through eBCS APs without scanning and association. eBCS AP appends metadata (e.g., such as IP, date/time, location, RSSI, etc.) to the packets before forwarding to the destination server. Meta-data from an eBCS AP may be protected.

In order to manage the network, considering the network may serve simultaneously associated and non-associated WTRUs, there is a need for a mechanism to query the WTRUs for the services being consumed.

There is also a need for a mechanism to facilitate the discovery of WTRUs consuming a particular broadcast service. In some cases, the WTRUs may be associated or not associated with the querying entity.

An IEEE 802.11bc network may comprise of one or more APs broadcasting one or more services in an area (e.g., a stadium or B5G home). These services may include for example, sensor and context information for the area. In order to optimize the network and to not consume unneeded resources, the 802.11bc network needs a mechanism to be able to determine which services are being consumed by the WTRUs regardless of whether or not they are associated with the network. Therefore, non-associated WTRU information may not be directly available to the AP.

In one or more embodiments, there may be systems and procedures for the discovery of eBCS Services consumed by non-associated/associated WTRUs using an access network query protocol (ANQP). In order to use ANQP to discover the services provided by a non-associated/associated STA, legacy ANQP elements may include a query and response type. For example, see Table 1. For reference, Q element is an ANQP request, S Q element is an ANQP response, T element may be transmitted by a MAC entity, R element may be received by a MAC entity, and G is a group addressed ANQP request/response that may be transmitted and received by a MAC entity.

TABLE 1

| ANQP Element name | ANQP element type | BSS | | |
| --- | --- | --- | --- | --- |
| | | AP | Non-AP and non-PCP STA | IBSS STA |
| eBCS STA Consumed Service Discovery Request | Q | T, G | R, G | T, R, G |
| eBCS STA Consumed Service Discovery Response | S | R, G | T, G | T, R, G |

Once the ANQP element is defined, the element carried in a general advertisement service (GAS) frame is needed. Accordingly, an eBCS WTRU consumed discovery request may be used for an AP to query non-associated and associated WTRUs in the vicinity to discover the services they are consuming. An Example of this is show below in Table 2.

TABLE 2

| | Info ID | Length | Service IDs List |
| --- | --- | --- | --- |
| Octets | 2 | 2 | Variable |

The Service IDs list contains a list of service identifiers the AP is requesting WTRUs to report if they are consuming the identified service. An example format is shown in Table 3.

TABLE 3

| | Number of elements | eBCS ID List |
|---|---|---|
| Octets | 1 | Variable |

The Number of elements field may indicate the number of elements in the eBCS ID List. For example, the eBCS ID list field contains a list of identifiers for the eBCS service which may be mapped to the actual packets received by the WTRU. Each eBCS ID List element may follow the format indicated in Table 4.

TABLE 4

| | Type | Element |
|---|---|---|
| Octets | 1 | Variable |

The Type field may indicate the type of ID used in this element of the eBCS ID List and may take the values specified in Table 5.

TABLE 5

| Type | Description | Length of Element (bits) |
|---|---|---|
| 0 | UDP/IPv4 Address | 48 (32 bits of IPv4 + 16 bits for UDP port) |
| 1 | UDP/IPv6 Address | 144 (128 bits of IPv6 + 16 bits for UDP port) |
| 2 | MPEG Transport Stream Identifier | 32 |
| 3 | MAC Address | 48 |
| 4-15 | Reserved | — |

The Element field may include the actual identifier of the type and length as defined in Table 5. In case of types 0 and 1, the format of the element includes a first element including the IP address and a second element of 2 bytes containing the UDP port used.

The use of the Service ID List enables an AP to query for the consumption of specific services to the stations periodically. This enables the AP to discontinue services without WTRUs listening to them.

Just the request message, there may be a reciprocal eBCS WTRU Consumed Service Discovery Response message. This ANQP element may correspond to the answer to the previous frame "eBCS STA Consumed Service Discovery Request", and may provide a mechanism for a WTRU to provide information on the eBCS services that the WTRU is consuming to the AP, including associated and non-associated STAs.

The format of this ANQP element is as shown in Table 6:

TABLE 6

| | Info ID | Length | Service IDs per AP List |
|---|---|---|---|
| Octets | 2 | 2 | Variable |

The Service IDs per AP List contain may contain a list of service identifiers that the WTRU is consuming based on the request from the AP. Its format is as is shown in Table 7.

TABLE 7

| | Number of elements | eBCS ID per AP List |
|---|---|---|
| Octets | 1 | Variable |

The Number of elements field may indicate the number of elements on the eBCS ID per AP List.

The eBCS ID per AP list field may contain a list of identifiers for the eBCS service which can be mapped to the actual packets received by the WTRU. The list of identifiers is preceded by the BSSID of the AP providing the eBCS service. Each eBCS ID List element follows the format indicated in Table 8.

TABLE 8

| | BSSID | Type | Element |
|---|---|---|---|
| Octets | 6 | 1 | Variable |

The Type field may indicate the type of ID used in this element of the eBCS ID List and may take the values specified in Table 9:

TABLE 9

| Type | Description | Length of Element (bits) |
|---|---|---|
| 0 | UDP/IPv4 Address | 48 (32 bits of IPv4 + 16 bits for UDP port) |
| 1 | UDP/IPv6 Address | 144 (128 bits of IPv6 + 16 bits for UDP port) |
| 2 | MPEG Transport Stream Identifier | 32 |
| 3 | MAC Address | 48 |
| 4-15 | Reserved | — |

The Element field may include the actual identifier of the type and length as defined in Table 3. In case of types 0 and 1, the format of the element includes a first element including the IP address and a second element of 2 bytes containing the UDP port used.

A pre-defined Groupcast Address for communication with a pre-associated eBCS WTRUs may be used in some scenarios. The use of ANQP over the GAS transport protocol may have some limitations, such as the fact that all frames are transmitted over a broadcast address. As such, all WTRUs in an area (e.g., not associated or associated) may need to process the message.

In order to solve this issue, a pre-defined Groupcast Address (e.g., multicast) may be used for the control messages of eBCS stations, in both associated and pre-associated states.

In this way, all eBCS control and management frames may be addressed to this specific address, using GAS over Groupcast addresses.

Specific queries to associated WTRUs which are known to the AP, may use the same messages sent to the specific unicast address of the WTRU.

Figure 2:
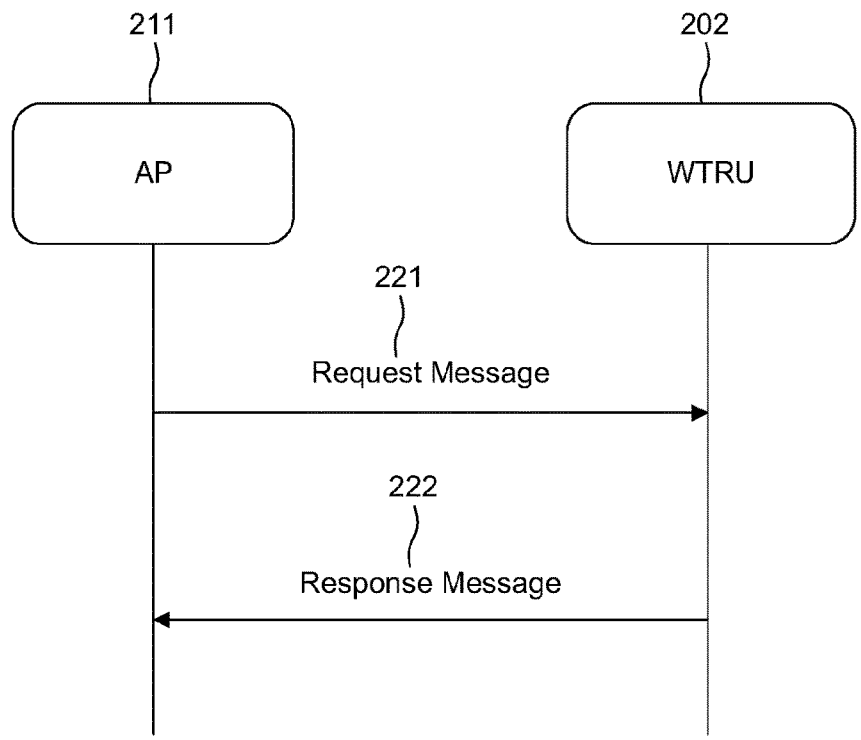
FIG. 2 illustrates an example of a services query procedure.

FIG. 2 illustrates an example of a services query procedure. In wireless communication systems, there may be one or more network nodes, such as one or more AP (e.g., 211 AP) that needs to determine the service capability of the stations in the area (e.g., 202 WTRU). This determination may be performed using a query procedure. Generally, a query request may be sent via an access network query protocol (ANQP). ANQP may be encapsulated in a generic advertisement service (GAS). Generally, a GAS exchange may comprise of a query request and a query response. Generally, in the examples discussed herein, WTRUs may be non-associated STAs or associated STAs.

Referring to the example of FIG. 2, the 211 AP may send 221 query message 221, such as a service request, to 202 WTRU, which in turn may respond with a message 222, such as a service response, to 211 AP. The request As discussed herein, one or more procedures may use this request/response dialogue to obtain the eBCS service consumption information from STAs. While not illustrated in the example of FIG. 2, there may be more than one AP, and more than one WTRU. For instance, 211 AP may send the request to multiple WTRUs. Additionally/alternatively, 201 WTRU may receive a request message from multiple APs.

Figure 3:
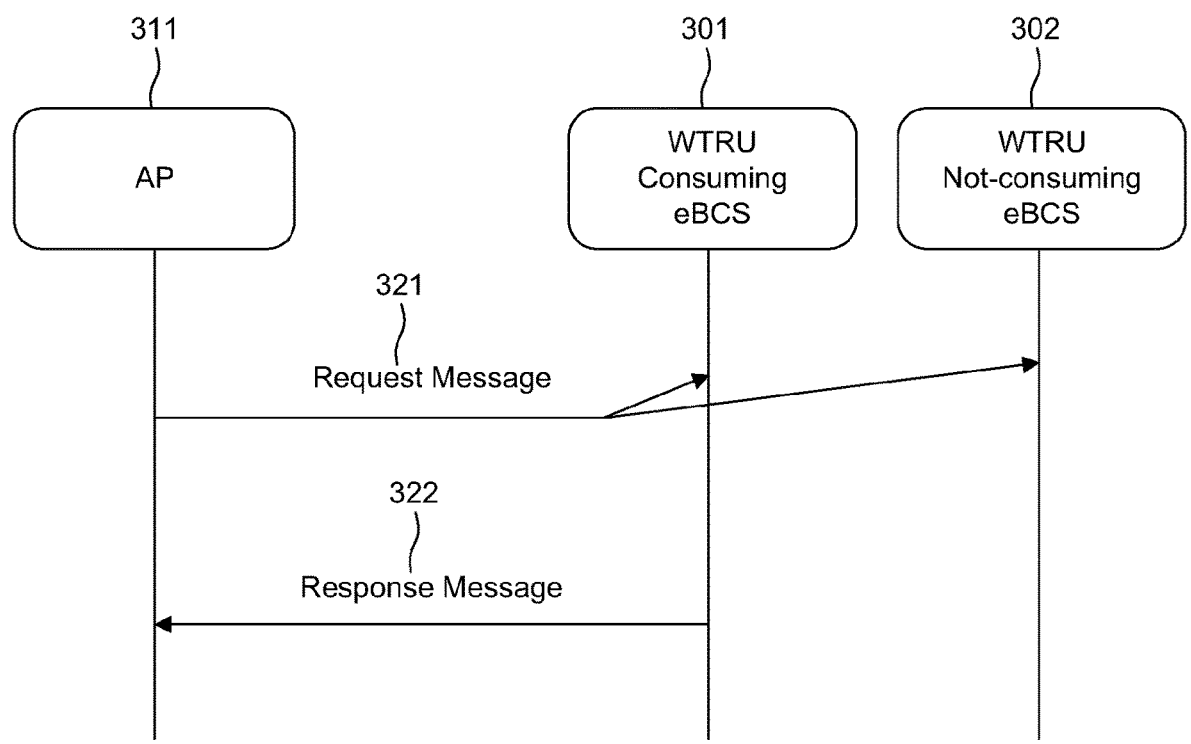
FIG. 3 illustrates an example of a services query procedure in which a broadcast destination address is used with ANQP.

FIG. 3 illustrates an example of a services query procedure in which a broadcast destination address is used with ANQP. As before, there is a message exchange: query request and a query response. 311 AP may send a message 321 of an eBCS WTRU consumed service discovery request. In one instance, the request message 321 may be a ANQP query encapsulated in a GAS. The request message 321 may be received by all WTRUs in a channel. Also in this example, the request message 321, may be sent to all STAs, but the message is directed towards STAs that consume eBCS (e.g., 301 WTRU) and not intended for STAs that do not consume eBCS (e.g., 302 WTRU). If the receiving WTRU is consuming eBCS (e.g., 301 WTRU, then the 301 WTRU may process the message 321 and send a message 322 of a eBCS STA consumed service discovery request response. In one instance, the response message 322 may be an ANQP query encapsulated in GAS. Note that the 302 WTRU is not consuming eBCS, therefore, the 302 WTRU may determine that no response to 311 AP is required. In this example, 311 AP may not include any specific eBCS services (e.g., eBCS IDs) in the request message 321; in such a case, 301 WTRU may report all eBCS services (e.g., eBCS IDs) that it may be consuming. The response message 322 may also include the BSSID of the AP that is associated with the eBCS services being consumed by 301 WTRU; though not illustrated, in a multi-AP system, there may be multiple APs providing eBCS services to 301 WTRU.

Figure 4:
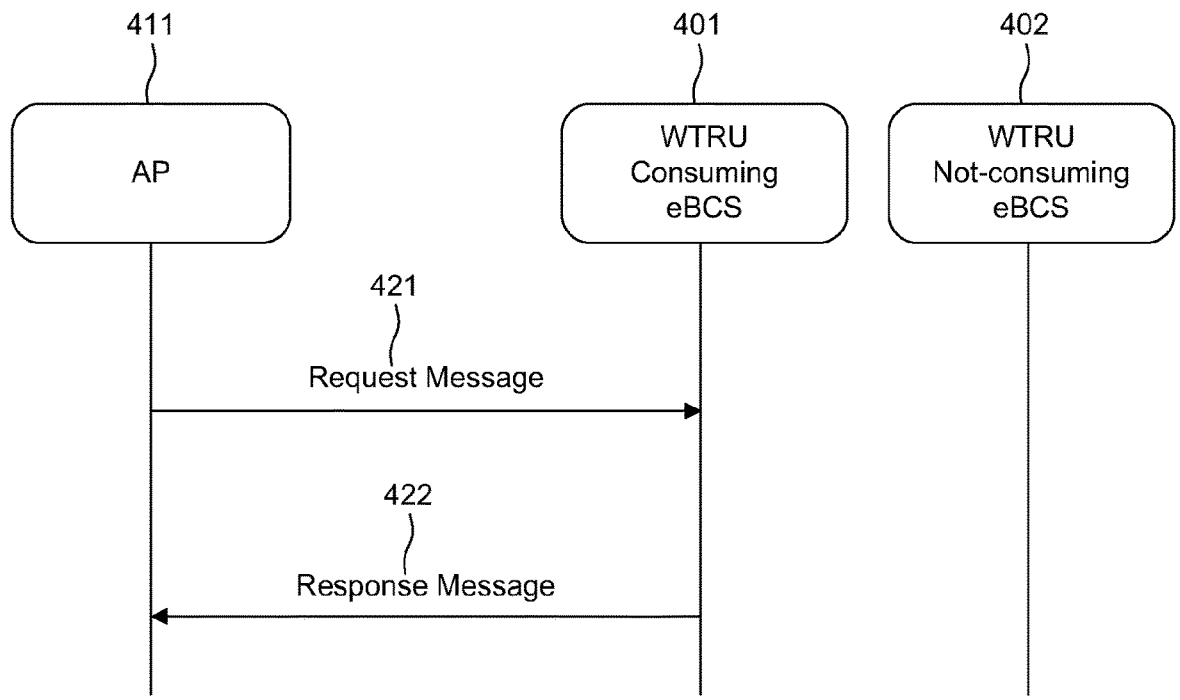
FIG. 4 illustrates an example of a services query procedure where a Groupcast address is used for the destination address.

FIG. 4 illustrates an example of a services query procedure where a Groupcast address is used for the destination address. This may be similar to the example of FIG. 3, where there is 411 AP sending a request message 421, and at least two WTRUs, 401 WTRU that consumes eBCS and 402 WTRU that does not consume eBCS. However, in the example of FIG. 4, the request message 421 is sent using a groupcast address directed towards eBCS consuming WTRUs (e.g., 401 WTRU). Therefore, only eBCS WTRUs may be listening to this address and the ANQP query does not need to be processed by all WTRUs (e.g., 402 WTRU) in the channel, reducing overhead. Accordingly, 401 WTRU may send a response message 422 similar to the response message of FIG. 3 (e.g., 322). Also similar to the example of FIG. 3, 411 AP may not include any specific eBCS services in the request. Hence, WTRUs may report all eBCS services that they may be consuming.

Figure 5:
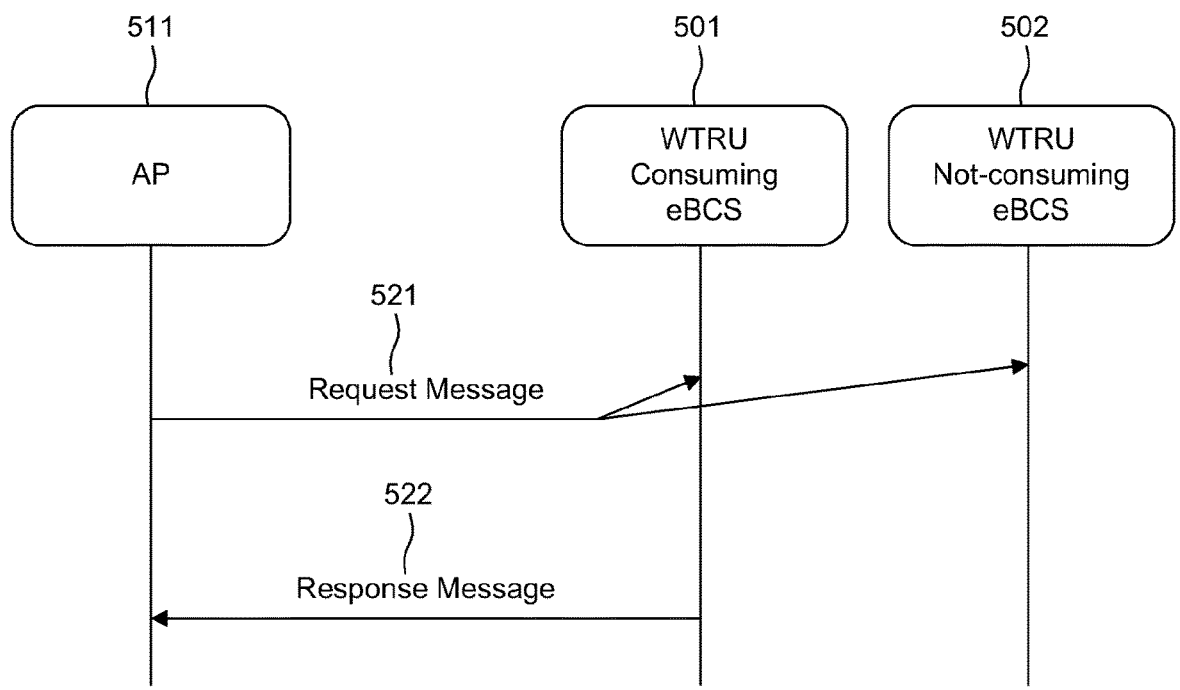
FIG. 5 illustrates an example of a services query procedure for specific eBCS services.

FIG. 5 illustrates an example of a services query procedure for specific eBCS services. This may be similar to the example of FIG. 3, where there is 511 AP sending a request message 521, and at least two WTRUs, 501 WTRU that consumes eBCS and 502 WTRU that does not consume eBCS. However, in the example of FIG. 5 511 AP may specify the specific eBCS services in the request message 521. For instance, the request message 521 may comprise an eBCS STA consumed service discovery request specifying individual services using their respective eBCS ID (e.g., via an ANQP query encapsulated in GAS). In response, the WTRUs that are consuming eBCS services may process the message, and send a response message 522. For instance, the response message 522 may comprise an eBCS STA consumed service discovery response specifying the eBCS ID and the associated BSSID of the AP sending the service of the specific eBCS ID (e.g., via an ANQP query encapsulated in GAS). In this way, the eBCS system (e.g., 511 AP) may learn/determine what WTRUs are consuming a certain service (e.g., eBCS ID) and from which AP (e.g., BSSID), in the case of a multi-AP eBCS system scenario.

Figure 6:
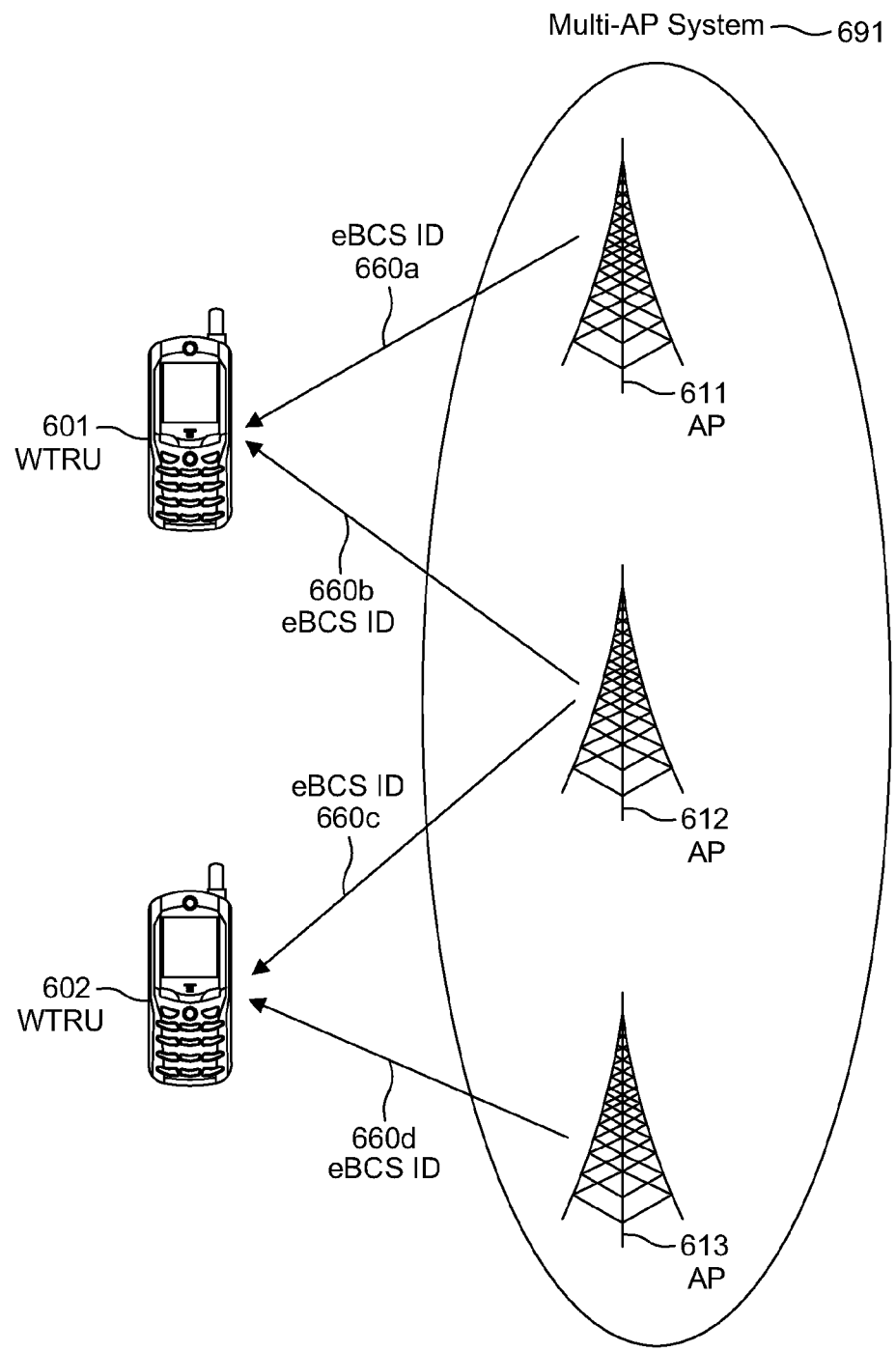
FIG. 6 is a system diagram illustrating an example multi-AP communications system that makes use of eBCS.

FIG. 6 is a system diagram illustrating an example multi-AP communications system that makes use of eBCS. Specifically, the multi-AP system 691 may comprise of a plurality of APs (e.g., 611, 612, and 613). These APs may each communicate with one or more WTRUs (e.g., 601 and 602). In FIG. 6, there is an example of an eBCS multi-AP system/network 691. Each AP may sending the same or different services, each service having an identifier (e.g., eBCS-ID 660). The one or more services are broadcasted by the three APs 611, 612, 613 and the two WTRUs 601, 602 are consuming the one or more service.

In one or more embodiments, there may be techniques to optimize a wireless network, such as an eBCS multi-AP system/network, using one or more of the query response/request eBCS related procedures discussed herein. The optimization of the network may be based on the knowledge of the services consumed by WTRUs and the APs providing the services.

Figures 7, 8:
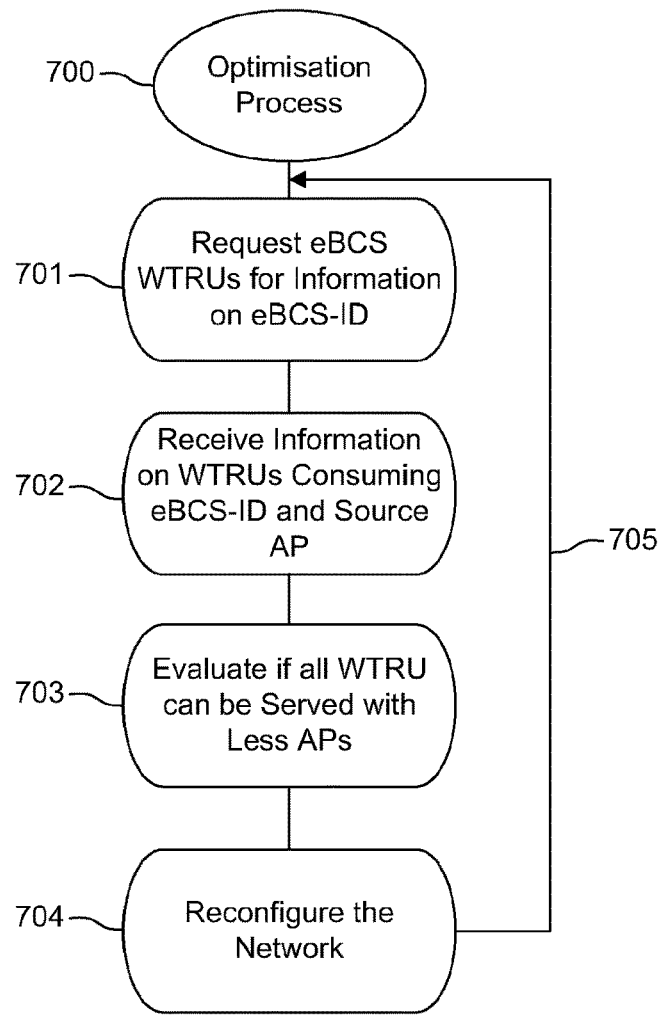
FIG. 7 is an example of an optimization process. In one example, this process may optimize the number of APs transmitting a certain eBCS service.
FIG. 8 illustrates an example of an optimization algorithm.

FIG. 7 is an example of an optimization process. In one example, this process may optimize the number of APs transmitting a certain eBCS service. The APs may use the eBCS WTRU consumed service discovery request, as discussed herein, to gather information regarding the eBCS services consumed by the eBCS WTRUs. Once the request reaches the WTRUs, they may answer through a response containing a list/set of eBCS services consumed and the AP they are consuming the service from. While the example of FIG. 7 is demonstrated from the perspective of an AP network node, the same process may be carried out by a WTRU with the purpose of carrying out the optimization.

As shown, the optimization process 700 may begin with sending 701 a request from a network node (e.g., AP) to one or more eBCS WTRUs for information on eBCS (e.g., the request may be specific to an eBCS ID, or may be non-specific looking for all eBCS IDs consumed by the WTRU). At 702, the network node may receive a response of information on WTRUs consuming eBCS ID(s) and their respective source APs (e.g., BSSID). At 703, the network node may evaluate whether all of the responding WTRUs can be served with fewer APs. At 704, the network node may send instructions to, or may carry out an operation to, reconfigured the network based on the evaluation. In some cases, the optimization may repeat periodically or a-periodically.

FIG. 8 illustrates an example of an optimization algorithm. Based on the information gathered (e.g., as discussed herein, such as the response message or the evaluation), an optimization algorithm may be used to optimally balance the services being distributed by each AP belonging to an eBCS multi-AP system. This optimization is relevant for energy efficiency and to optimize the time the channel is busy.

According to the example of FIG. 8, in the algorithm the AP and eBCS variables may be binary. The AP variable may represent the use of an AP. The AP variable may be set to 1 if the AP is active at all, while it may take the value of 0 if it is not being used to broadcast any eBSC service. The eBCS variable may be set containing one binary variable representing the consumption of a service i, transmitted by AP j, and consumed by the STA k. The example algorithm may be a binary linear optimization problem, and heuristics may be found to produce near-optimal results in an online manner.

In one example, referring again to a scenario such as that shown in FIG. 6, if, after an optimization process as discussed herein, a network has been optimized such that service 660d is no longer needed, then eBCS ID 660d may be discontinued, and 613 AP would not provide a service 660d to 602 WTRU. As mentioned, the optimization could be performed again, and in one example 660d could be restarted, or another service could be discontinued. Generally, after the optimization process has been performed there may be information of what each AP is sending to each STA in a given area (e.g., because this information can be gathered from STAs that are not necessarily associated with the inquiring device); based on this information, a network node (e.g., AP or WTRU), may be able to perform one or multiple actions related to network management (e.g., turning one AP off, and transmitting a service previously sent through the now turned off AP through a different AP).

In one example, there may be an 802.11 network, method, and procedure for providing information related to eBCS services. The procedures may begin by a WTRU receiving a request from an Access Point (AP) for information related to which eBCS services the WTRU is consuming. Then the WTRU may send a response that includes an indication of which eBCS services the WTRU is consuming. The response may include an indication of at least one AP that the WTRU is consuming eBCS from. The request may be an ANQP query encapsulated in a GAS broadcast message. The request may be an ANQP query encapsulated in a GAS groupcast message. The eBCS services may include at least one of a stadium video distribution service, low power sensor UL broadcast service, intelligent transportation broadcast service, broadcast services for event production service, multi-lingual and emergency broadcast service, VR eSports video distribution service, multi-channel data distribution service, lecture room slide distribution service, regional based broadcast TV service, and an AP tagged UL Forwarding service. The response may be used by the network to reconfigure which APs provide eBCS services to the WTRU.

In one example, a wireless network node (e.g., an AP, a STA, a WTRU, virtual entity, etc.), may perform a method for surveying the services being consumed within an area. The network node may send a consumed service discovery request to a station (STA), wherein the STA is not associated with the network node. The network node may then receive a consumed service discovery response including a set of service IDs and a BSSID of an access point (AP) for each service ID in the set of service IDs, wherein each service ID of the set of service IDs is a service consumed by the STA. In some cases the consumed services may be enhanced broadcast services (eBCS). In some cases the consumed service discovery request is an access network query protocol (ANQP) query encapsulated in a general advertising service (GAS) broadcast message. In some cases the consumed service discovery request is an access network query protocol (ANQP) query encapsulated in a general advertising service (GAS) groupcast message or a GAS unicast message. In some cases the consumed service discovery request includes a specific set of service IDs, and the set of service IDs received in the consumed service discovery response includes only services consumed by the STA that were indicated in the specific set of service IDs. In some cases the set of service IDs received in the consumed service discovery response includes service IDs and associated BSSIDs for all services consumed by the STA. In some cases the consumed service discovery request is sent to a groupcast address. In some cases the groupcast address is specific to any STA consuming eBCS. In some cases the network node may optimize resources of a wireless network that includes the APs that are providing the eBCS services based on the consumed service discovery response, wherein the wireless network node is an AP of the multi-AP system. The optimization may be performed by sending instructions and/or control signaling to the service providing APs. In some cases, the eBCS services include at least one of a stadium video distribution service, low power sensor uplink broadcast service, intelligent transportation broadcast service, broadcast services for event production service, multi-lingual and emergency broadcast service, virtual reality eSports video distribution service, multi-channel data distribution service, lecture room slide distribution service, regional based broadcast TV service, and an AP tagged uplink Forwarding service.

In one example, a wireless network node (e.g., an AP, a STA, a WTRU, virtual entity, etc.), may perform a method that provides surveying information regarding the services being consumed within an area by the network node. In some cases, the method may be implemented by an enhanced broadcast services (eBCS) station (STA). The STA may receive a consumed service discovery request from a network node, wherein the STA is not associated with the network node. The STA may send a consumed service discovery response including a set of service IDs and a BSS ID of an access point (AP) for each service ID in the set of service IDs, wherein each service ID of the set of service IDs is a service consumed by the eBCS STA. In some cases the consumed services may be enhanced broadcast services (eBCS). In some cases the consumed service discovery request is an access network query protocol (ANQP) query encapsulated in a general advertising service (GAS) broadcast message. In some cases the consumed service discovery request is an access network query protocol (ANQP) query encapsulated in a general advertising service (GAS) groupcast message or a GAS unicast message. In some cases the consumed service discovery request includes a specific set of service IDs, and the set of service IDs received in the consumed service discovery response includes only services consumed by the STA that were indicated in the specific set of service IDs. In some cases the set of service IDs received in the consumed service discovery response includes service IDs and associated BSSIDs for all services consumed by the STA. In some cases the consumed service discovery request is sent to a groupcast address. In some cases the groupcast address is specific to any STA consuming eBCS. In some cases, the eBCS services include at least one of a stadium video distribution service, low power sensor uplink broadcast service, intelligent transportation broadcast service, broadcast services for event production service, multi-lingual and emergency broadcast service, virtual reality eSports video distribution service, multi-channel data distribution service, lecture room slide distribution service, regional based broadcast TV service, and an AP tagged uplink Forwarding service.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a station (STA) in a wireless communication system, the method comprising:
    identifying a first device of a plurality of devices in the wireless communication system from which packets are currently being received for an enhanced broadcast service (eBCS);
    transmitting, to a second device of the plurality of devices, a message related to the eBCS that indicates an identifier of the eBCS being consumed by the STA and an identifier of the first device of the plurality of devices from which the STA is currently receiving the packets for the eBCS.

2. The method of claim 1, wherein the identifying of the first device is based on a received eBCS request message from the second device.

3. The method of claim 1, wherein the plurality of devices comprise a plurality of access points (APs), wherein the first device is a first AP, and wherein the second device is a second AP.

4. The method of claim 3, wherein the wireless communication system is an 802.11 wireless communication system, and wherein the second AP comprises an associated AP of the STA in the wireless communication system.

5. The method of claim 3, further comprising:
    receiving, from the second AP in response to the message, a reconfiguration of at least one AP of the plurality of APs other than the first AP from which the packets are currently being received for the eBCS; and
    receiving the eBCS from the at least one AP.

6. The method of claim 1, wherein the first device is an AP, and wherein the second device is another STA.

7. The method of claim 1, wherein the message comprises an access network query protocol (ANQP) element.

8. The method of claim 1, wherein the identifier of the first device comprises a MAC address.

9. The method of claim 1, wherein the message is configured with an octet indicating an identifier of the eBCS.

10. A station (STA) capable of operating in a wireless communication system, the STA comprising:
    a transceiver; and
    a processor configured to:
        identify a first device of a plurality of devices in the wireless communication system from which packets are currently being received for an enhanced broadcast service (eBCS);
        transmit, via the transceiver, to a second device of the plurality of devices, a message related to the eBCS that indicates an identifier of the eBCS being consumed by the STA and an identifier of the first device of the plurality of devices from which the STA is currently receiving the packets for the eBCS.

11. The STA of claim 10, wherein the identification of the first device is based on a received eBCS request message from the second device.

12. The STA of claim 10, wherein the plurality of devices comprise a plurality of access points (APs), wherein the first device is a first AP, and wherein the second device is a second AP.

13. The STA of claim 12, wherein the wireless communication system is an 802.11 wireless communication system, and wherein the second AP comprises an associated AP of the STA in the wireless communication system.

14. The STA of claim 12, wherein the processor is further configured to:
    receive, via the transceiver, a reconfiguration of at least one AP of the plurality of APs from the second AP in response to the message, wherein the at least one AP is other than the first AP from which the packets are currently being received for the eBCS; and
    receive the eBCS from the at least one AP.

15. The STA of claim 10, wherein the first device is an AP, and wherein the second device is another STA.

16. The STA of claim 10, wherein the message comprises an access network query protocol (ANQP) element.

17. The STA of claim 10, wherein the identifier of the first device comprises a MAC address.

18. The STA of claim 10, wherein the message is configured with an octet indicating an identifier of the eBCS.

19. An access point (AP) implemented in a wireless communication system, the AP comprising:
    a transceiver;
    a processor configured to:
        receive, via the transceiver, a message related to an eBCS currently being consumed at a station (STA), wherein the message that indicates an identifier of the eBCS being consumed by the STA and an identifier of another AP from which the STA is currently receiving packets for the eBCS.

20. The AP of claim 19, wherein the wireless communication system is an 802.11 wireless communication system, and wherein the STA is associated with the AP in the wireless communication system.

21. The AP of claim 19, wherein the identifier is an identifier of a first device of a plurality of devices in the wireless communication system, and wherein the identifier comprises a MAC address.

22. The AP of claim 19, wherein the message is configured with an octet indicating an identifier of the eBCS.

* * * * *